United States Patent Office 3,196,710
Patented July 27, 1965

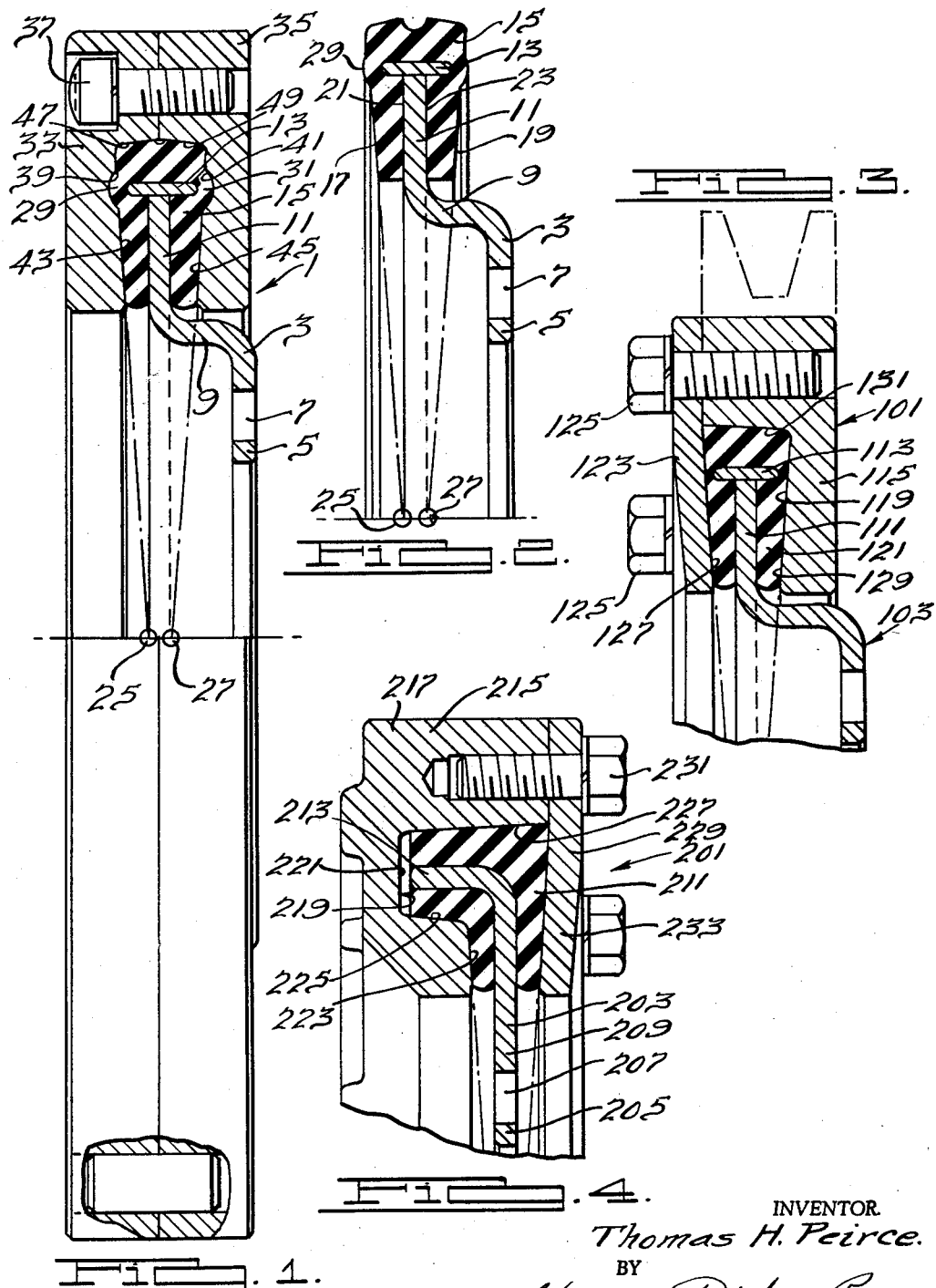

3,196,710
DAMPER
Thomas H. Peirce, 16725 Shaftsbury, Detroit, Mich.
Filed July 22, 1963, Ser. No. 296,646
9 Claims. (Cl. 74—574)

My invention relates to torsional vibration dampers of the type that may be attached to the crankshafts of internal combustion engines to remove torsional oscillations therein.

It is an object of my invention to provide a rubber type torsional vibration damper in which the gravity weight load of the inertia member is held to a minimum unit stress in the rubber thereby prolonging the life of the damper.

The invention accomplishes the foregoing and other objects by means of a construction in which the retainer is provided with a flange that is embedded in the rubber. The weight of the inertia member is transferred into the flange at a relatively low unit stress thereby avoiding premature shear failures of the rubber.

The invention is illustrated in the accompanying drawings in which:

FIGURE 1 is a side elevation, partly in radial section and partly broken away, of a damper embodying the invention;

FIG. 2 shows the subassembly of retainer and rubber used in FIG. 1;

FIG. 3 is a cross section similar to that of FIG. 1 of another form of the invention; and FIG. 4 is a cross section similar to that of FIGS. 1 and 3 of another form of the invention.

The torsional vibration damper 1 of FIGS. 1–2 has a stamped retainer member 3 with a center portion 5 having bolt holes 7 whereby it may be connected to the crankshaft or part to be damped. The center portion 5 of the retainer is turned outwardly in an annular section 9 and this is then bent into an annular radial section 11 that terminates in a peripheral flange 13 that is welded or otherwise secured to the outer edge of section 11.

The rubber body 15 is molded around the sections 11 and 13 as seen in FIG. 2. The side faces 17 and 19 of the rubber are on a taper so that they intersect the side faces 21 and 23 of the radial section 11 on the center line of the damper as seen at points 25 and 27. The rubber is bulged outwardly immediately opposite the side edges of flange 13 as seen at 29 and 31 so as to provide for some thickness of rubber at these points.

The inertia member comprises two halves 33 and 35 that engage on the midplane of the damper and are bolted and connected together by bolts and dowels 37 so that they act as a unit. The two halves 33 and 35 have rubber receiving recesses 39 and 41 with side faces 43 and 45 tapered on the same angle as the rubber faces they engage and which include annular grooves to receive the rubber bulges 29 and 31. The peripheries 47 and 49 of the recesses 39 and 41 are tapered as shown, and the rubber as molded (FIG. 2) is made thicker and of greater volume than the combined width and volume of the recesses, so that when the two inertia member halves are bolted together the rubber body 15 will be substantially compressed and axially preloaded. By forming the side faces of the rubber on the specific tapers described, the rubber is in a uniform state of shear through its radial length. The rubber body 15 is the only means of connecting the inertia member to the retainer. By tuning the damper (selecting the right weight of inertia member and size and hardness of rubber) the damper will attenuate vibrations at the frequency to which the damper is tuned.

The damper is used with the center line 51 in a horizontal position. The weight of the inertia member is therefore carried by the rubber 15 and transmitted by it into the retainer 3. It will be seen that the flange 13 is of substantial width and area so that the unit stress in the rubber due to the gravity load of the inertia member is low and will not cause internal shear failures of the rubber as has occurred in prior designs.

FIG. 3 shows a modified form of damper 101 in which the retainer 103 is identical to retainer 3 and has a radial section 111 and a peripheral flange 113. In this form, the inertia member 115 comprises a body section 117 with a cavity 119 for the rubber body 121. A cover 123 is secured to the body section 117 by bolts 125. The side faces of the rubber 121, cavity 119, and cover 123 are tapered as seen at 127 and 129 in the manner described in connection with FIGS. 1–2. The periphery 131 of the cavity 119 is tapered so that the rubber, which is molded to retainer 103 so that it is wider than the cavity, will be compressed axially of the damper when the cover plate 123 is bolted to body section 117.

In the modification of FIG. 4, the damper 201 has a retainer 203 with a central mounting portion 205, having bolt holes 207, coplanar with the radial section 309 that is embedded in the rubber body 211. The retainer has a peripheral flange 213 integral therewith to take the weight of the inertia member 215 and spread it over a substantial area so as to minimize the unit stress on the rubber. The inertia member 215 has a body portion 217 with a rubber receiving cavity 219 that has two radial side faces 221 and 223 and a connecting tapered surface 225 which cooperates with tapered peripheral surface 227. A cover plate 229 is attached by bolts 231 to the body section 217 and has a radial face 233 engaging and axially compressing the rubber during assembly in cooperation with tapered surfaces 225 and 227 to preload the rubber body. The faces 223 and 233 are tapered in the manner described for faces 43 and 45 (as are the rubber faces).

It will be seen that in all three embodiments the rubber is axially preloaded in an optimum manner and that the weight of the inertia member is taken by a flange on the retainer with a minimum shear stress in the rubber.

Modifications in the structure illustrated may be made without departing from the spirit and scope of the invention.

I claim:

1. A torsional vibration damper for damping oscillations about an axis, comprising an inertia member having a cavity therein, a rubber body compressed in said cavity, and a retainer having a part radial to said axis and an outermost peripheral part annular with respect to said axis, said annular part being materially wider than said radial part, both said parts being embedded in said rubber and said annular part supporting the weight of the inertia member.

2. The invention set forth in claim 1 wherein said annular part comprises a ring secured to the end of the radial part and extending on both axial sides of the radial part.

3. The invention set forth in claim 1 wherein said annular part comprises a flange formed on the retainer at right angles to the radial part.

4. The invention set forth in claim 1 wherein the cavity and the rubber body have engaging radial side faces that taper toward each other so that the rubber body is wedge-shaped in radial cross section.

5. The invention set forth in claim 1 wherein the cavity has an outer peripheral surface that is tapered to facilitate axial compression of the rubber in the cavity.

6. The invention set forth in claim 5 wherein the cavity has two radially separated peripheral surfaces that are tapered to facilitate axial compression of the rubber in the cavity.

7. The invention set forth in claim 1 wherein the inertia member is formed in two halves with one half said cavity in each half of the inertia member.

8. The invention set forth in claim 1 wherein said inertia member comprises a body member containing said cavity and a cover plate compressing the rubber into said cavity.

9. The invention set forth in claim 1 wherein said rubber is molded to said retainer and has a greater volume in molded subassembly than the volume of said cavity.

References Cited by the Examiner

UNITED STATES PATENTS

| 1,916,309 | 7/33 | Griswold | 74—574 |
| 2,723,573 | 11/55 | Dillman | 74—574 |
| 2,955,795 | 10/60 | Painter | 188—1 |

FOREIGN PATENTS

| 814,062 | 5/59 | Great Britain. |

BROUGHTON G. DURHAM, *Primary Examiner.*
MILTON KAUFMAN, *Examiner.*